United States Patent
Ludwig et al.

(10) Patent No.: US 9,822,839 B2
(45) Date of Patent: Nov. 21, 2017

(54) HYDRAULICALLY DAMPING RUBBER BEARING

(71) Applicants: BOGE Elastmetall GmbH, Damme (DE); Audi AG, Ingolstadt (DE)

(72) Inventors: Volker Ludwig, Großenkneten (DE); Stefan Loheide, Wallenhorst (DE); Thomas Conrad, Treuchtlingen (DE); Wolfgang Unger, Gaimersheim (DE)

(73) Assignees: BOGE ELASTMETALL GMBH, Damme (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/894,557

(22) PCT Filed: Apr. 30, 2014

(86) PCT No.: PCT/EP2014/058863
§ 371 (c)(1),
(2) Date: Mar. 7, 2016

(87) PCT Pub. No.: WO2014/191150
PCT Pub. Date: Dec. 4, 2014

(65) Prior Publication Data
US 2016/0195155 A1 Jul. 7, 2016

(30) Foreign Application Priority Data

May 29, 2013 (DE) .................. 10 2013 209 990

(51) Int. Cl.
*F16F 13/14* (2006.01)
*F16F 13/28* (2006.01)

(52) U.S. Cl.
CPC .............. *F16F 13/14* (2013.01); *F16F 13/28* (2013.01)

(58) Field of Classification Search
CPC ........ F16F 13/14; F16F 13/28; F16F 13/1409; F16F 13/1418; F16F 13/1463; F16F 13/16; F16F 13/26
See application file for complete search history.

(56) References Cited

U.S. PATENT DOCUMENTS 4,702,346 A * 10/1987 Uno ................ F16F 13/14
181/207
4,840,359 A * 6/1989 Hamaekers ........ F16F 13/14
267/140.12

(Continued)

FOREIGN PATENT DOCUMENTS

DE       102 13 627       10/2003
DE       102005003052     8/2006

(Continued)

OTHER PUBLICATIONS

International Search Report from co-pending international application Serial No. PCT/EP2014/058863, filed Apr. 30, 2014.

*Primary Examiner* — Xuan Lan Nguyen
(74) *Attorney, Agent, or Firm* — Cohen & Hildebrand, PLLC (57) ABSTRACT

A hydraulically damping rubber bearing has a substantially hollow-cylindrical inner portion and an outer portion disposed with a predetermined spacing relative to the inner portion. A resilient connection portion is disposed between the inner portion and the outer portion and connects the outer portion to the inner portion. The resilient connection portion has a first hydraulic damping circuit with at least two first fluid chambers which are in fluid communication with each other by means of a first flow connection. The first hydraulic damping circuit has a damping action in a predetermined direction. A second hydraulic damping circuit provides a (Continued)

damping action in the same predetermined direction as the first hydraulic damping circuit.

19 Claims, 3 Drawing Sheets

(56) References Cited

U.S. PATENT DOCUMENTS

| | | | | |
|---|---|---|---|---|
| 4,861,005 A * | 8/1989 | Bausch | ............... | F16F 13/28 267/140.12 |
| 5,102,106 A * | 4/1992 | Thelamon | ........... | F16F 13/14 267/140.12 |
| 5,139,241 A * | 8/1992 | Hamaekers | .......... | F16F 13/28 267/140.11 |
| 5,172,893 A * | 12/1992 | Bouhier | ............... | F16F 13/16 180/312 |
| 5,178,376 A * | 1/1993 | Hamaekers | ......... | F16F 13/1418 267/140.11 |
| 5,595,373 A * | 1/1997 | Ikeda | .................. | F16F 13/14 267/140.12 |
| 5,895,031 A * | 4/1999 | Meyer | ................... | F16F 13/14 267/140.12 |
| 5,908,186 A * | 6/1999 | Bellamy | ............... | F16F 13/14 267/140.12 |
| 6,007,072 A * | 12/1999 | Yoon | .................. | B60G 7/006 267/140.12 |
| 6,015,141 A * | 1/2000 | Rudolf | ................. | F16F 13/14 267/140.12 |
| 6,386,529 B2 * | 5/2002 | Bik | ..................... | F16F 13/16 267/140.13 |
| 6,561,501 B2 * | 5/2003 | Bouhier | ............... | F16F 13/18 267/140.12 |
| 7,392,976 B2 * | 7/2008 | Siemer | ............... | F16F 13/1463 267/140.12 |
| 7,441,757 B2 * | 10/2008 | Siemer | ............... | F16F 13/1463 267/140.12 |
| 2015/0226258 A1 | 8/2015 | Ludwig et al. | | |

FOREIGN PATENT DOCUMENTS

| | | |
|---|---|---|
| DE | 10 2012 213 440 | 2/2014 |
| EP | 0421052 A1 | 4/1991 |
| EP | 0460278 A1 | 12/1991 |
| JP | H02245538 A | 10/1990 |

* cited by examiner

Fig. 3E

HYDRAULICALLY DAMPING RUBBER BEARING

CROSS-REFERENCE TO RELATED APPLICATIONS

This application is the U.S. national phase of international application Serial No. PCT/EP2014/058863, filed Apr. 30, 2014, which claims priority from international application Serial No. DE 10 2013 209 990.8, filed May 20, 2013, the contents of which are incorporated herein in their entirety.

FIELD OF THE INVENTION

The invention relates to a hydraulically damping rubber bearing.

BACKGROUND OF THE INVENTION

Hydraulically damping rubber bearings are used in the prior art for the damped support of components of a motor vehicle, such as, for example, a guiding link or a front axle of a motor vehicle.

With increasing demands of comfort, the significance of the damping of oscillations produced in a motor vehicle or external oscillations which are transmitted, for example, from the road to the vehicle, is increasing. This is particularly significant as a result of the required reduction of the noise level in the inner space and the reduction of vibrations, which are perceived to be unpleasant. As a result of the positive resilient and damping properties of elastomer materials, elastomer bearings—in this instance also referred to as rubber bearings—are increasingly used, in order, for example, to support the drive unit or movable components in the motor vehicle. The specific composition of the elastomer has a significant influence on the quality and the damping properties. As a result of a change of the material composition of the elastomer, the hardness and the resilience of the bearings can be influenced in a decisive manner. However, a limit is set on this variability where high oscillation amplitudes have to be damped. These are produced, for example, when the drive unit is in idle mode or when movements act in a periodic and abrupt manner on the chassis on an uneven road surface. Damping these so-called resonance oscillations is possible only in a limited manner using conventional elastomer bearings. However, since particularly resonance oscillations are perceived to be very disruptive and very unpleasant in the vehicle and can further bring about damage to cost-intensive components, hydraulically damping elastomer bearings are becoming increasingly widespread in modern motor vehicles. These have at least two chambers which are separated from each other and in which a damping fluid is contained. The chambers are connected to each other by means of a flow channel and are deformed in the event of an external force acting on the elastomer bearing so that damping fluid can pass from one chamber to the other. The chamber walls provide resistance to the shape change which leads to a pressure change in the chambers. A measurement for this pressure change as a result of the volume displacement which is produced thereby is referred to as the "deflection spring rate". In order to compensate for the pressure difference between the chambers, the chambers are connected to each other by means of the flow channel. In the event of deflection at low frequencies, there is a pressure compensation between the chambers exclusively via this flow channel. Consequently, the elastomer body makes a significant contribution to the resilience and damping of the elastomer bearing in this instance. As the frequency increases, however, a damped system which is capable of oscillation and which comprises the resilient chamber walls and the mass of the damping fluid located in the flow channel becomes increasingly important. If an elastomer bearing becomes excited with hydraulic damping in the region of a resonance frequency, the damping changes and consequently the resilient properties of the elastomer bearing as a whole change. Above the resonance frequency, the inertia of the quantity of fluid in the flow channel and the friction ultimately prevent a further pressure compensation between the chambers. The rigidity of the chamber walls thus supports the carrier rigidity and brings about an increase of the overall rigidity in comparison with low-frequency loads.

The damping action of rubber bearings of the generic type is accordingly based on the principle of a viscous friction damping which is achieved by means of a fluid exchange between at least two fluid chambers which are connected in technical fluid terms within a relevant connection channel, which acts as a flow connection. In this instance, depending on the loading of the rubber bearing between the at least two fluid chambers, a volume of fluid is exchanged, whereby a damping of the bearing is achieved since the fluid volume which can be displaced between the fluid chambers, as a result of the mass inertia thereof and as a result of the fluid resistance, applies a damping action in a flow channel which is required for the fluid exchange. The (frequency) position of the damping maximum is in this instance dependent on the channel or throttle cross-section or the channel or throttle length of the connection or flow channel between the fluid chambers and the configuration of the deflection springs (active face and volume resilience).

In order to comply with specific requirements, it is known, for example, from DE 102 13 627 A1 to provide a flow connection between two fluid chambers which comprises at least two individual connections, of which at least one individual connection can be switched on or off.

Such switchable rubber bearings are consequently capable of preventing a fluid exchange between the fluid chambers, whereby the rigidity of the arrangement is increased. A volume resilience is then produced only via the rubber material of the bearing itself, that is to say, via the chamber walls of the fluid chambers.

SUMMARY OF THE INVENTION

In addition, in the previously known configurations of switchable rubber bearings, the switchable hydraulic connection is provided only in the transverse direction of the vehicle, whilst an additional damping action is provided in the vehicle longitudinal direction in the form of a non-switchable hydraulic connection. A selectively variable rigidity in the main damping direction (longitudinal direction of the vehicle) is not produced with previously known rubber bearings.

An object of the present invention is therefore to provide a rubber bearing by means of which selectively different rigidities are enabled in the main damping direction.

This object is achieved with a rubber bearing having the features described herein.

According to the invention, there is produced a hydraulically damping rubber bearing which comprises a substantially hollow-cylindrical inner portion and an outer portion which is arranged with a predetermined spacing relative thereto, wherein the inner portion and the outer portion are connected by means of a resilient connection portion (rubber connection portion) which is arranged between the inner portion and the outer portion. The rubber bearing has a first hydraulic damping circuit having at least two first fluid chambers which are in fluid communication with each other by means of a first flow connection and which have a damping action in a predetermined direction. The rubber bearing has a second hydraulic damping circuit, which provides a damping action in the same direction as the first hydraulic damping circuit. With the configuration according to the invention, consequently, there are provided second fluid chambers which are completely separated from the first fluid chambers and which have a damping action together with the first fluid chambers in the predetermined damping direction which may preferably be the main damping direction. As a result of the provision of the first and the second hydraulic damping circuit, whose damping action is consequently in the same direction, a rigidity switching can be provided with the resonance position and the loss angle being maintained, and selectively enables different rigidities in one predetermined damping direction, in particular the main damping direction. The relevant chamber volume and the volume resilience or the active face are preferably selected in such a manner that neither the resonance position nor the damping maximum are significantly changed.

Alternatively, the first and second damping circuit can also be referred to without limitation as a hydraulic bearing channel or a channel of the rigidity switching (operating channel).

According to a preferred embodiment, the first hydraulic damping circuit is constructed in an outer surface of the rubber bearing, in particular in an outer surface of the outer portion, and/or in a housing, in which the rubber bearing is received, or closed by means of the housing and flow channels which are provided at that location. The second hydraulic damping circuit may also be constructed in the outer surface of the rubber bearing, in particular in the outer surface of the outer portion, and/or in the housing or may be closed thereby. In this manner, there are a large number of configuration possibilities for the geometric construction and arrangement of the two damping circuits. In particular, it is readily possible in this manner for hydraulically damping rubber bearings according to a development of the invention with regard to the two damping circuits to be provided with different frequencies (frequency positions) of the respective maximum damping action and/or with different frequency dependencies of the damping action. Furthermore, there may be provision for the first damping circuit and the second damping circuit to have different fluid resistances. This can be achieved, for example, with different flow path lengths and/or different cross-sectional values or geometries. For example, one of the two damping circuits or the corresponding flow channel can be constructed to be relatively long and to have a relatively small cross-section, that is to say, correspondingly great fluid resistance, whilst the other damping circuit or flow channel is constructed to be relatively short and to have a relatively large flow cross-section, that is to say, correspondingly small fluid resistance.

According to another preferred embodiment, one of the first and second hydraulic damping circuits, in particular the second hydraulic damping circuit, can be switched, wherein the other of the first and second hydraulic damping circuits remains substantially uninfluenced in terms of its damping action, in particular with regard to the frequency dependency of the damping action, that is to say, in particular the position of the damping maximum. This can be produced by means of corresponding dimensions and/or geometries, in particular of the partition walls which are constructed at least partially in a resilient material (rubber) between the fluid chambers of the two hydraulic damping circuits but also via the sizing of the bearing of a cage of the outer portion, which bearing is provided in the region of the fluid chambers, so that, for example, even in the case of the second hydraulic damping circuit which is connected in a rigid manner and the reaction thereof on the first hydraulic damping circuit via (partially) resilient partition walls which are located therebetween, the frequency-dependency of the damping action substantially does not change. Consequently, the rubber bearing according to this embodiment is capable, in spite of the switchable rigidity of at least one damping circuit in a predetermined direction, of ensuring that a specific desired damping action in the dame direction, that is to say, the damping action which is achieved by the other damping circuit, is not substantially changed, in particular with regard to the frequency-dependency.

The first hydraulic damping circuit and the second hydraulic damping circuit preferably have different damping frequencies, whereby the damping range is increased.

Furthermore, it is preferable for the second hydraulic damping circuit to have at least two second fluid chambers (switching chambers), which are in fluid communication via a second flow connection (connection channel). This separate second flow connection can be locked or blocked, for example, by means of a switchable valve, wherein, by blocking the fluid movement between the corresponding fluid chambers in the manner of a rigidity switch, a cancelling of the total rigidity of the rubber bearing is achieved. As a result of the switchable valve, the switching chambers of the second damping circuit can therefore be separated in technical fluid terms in order to influence the rigidity of the bearing in a selective manner.

Preferably, the two fluid chambers are constructed with a U-shaped cross-section; the first fluid chambers may also have a substantially U-shaped cross-section. According to a specific embodiment of the present invention, in particular the fluid chambers of the second damping circuit may have at least partially an almost completely U-shaped cross-section with a central connection member which is rounded in a concave manner. In this instance, the mentioned delegated connection member is preferably constructed completely from the resilient material (rubber) of the connection member. In contrast, the fluid chambers of the first damping circuit may at least partially have a modified U-shape (V-shape), wherein the central connection member has a contour which is at least partially rounded in a convex manner, that is to say, which is curved forwards into the U-shape. In this instance, the central connection member is preferably also substantially completely constructed from the resilient material of the connection portion. The shaping and/or wall thickness of the connection members mentioned may be selected in such a manner that, when one damping circuit is switched to be rigid, there is substantially no influence of the damping action of the other damping circuit, as desired.

According to another preferred embodiment, the at least two second fluid chambers are arranged on the outer surface of the rubber bearing between the at least two, in particular four, first fluid chambers. Consequently, the second fluid chambers correspond to inner fluid chambers and the first fluid chambers correspond to outer fluid chambers, with respect to a longitudinal direction of the entire rubber bearing arrangement.

Preferably, the inner portion has a hollow-cylindrical core of metal which is surrounded by a rubber layer, which also forms the mentioned connection portion. The core itself serves to connect the rubber bearing to a component to be damped, for example, a chassis or bodywork component of a motor vehicle which may be secured within the hollow cylinder. Preferably, the inner portion is screwed to the bodywork, and the outer portion is pressed into a link.

Preferably, the outer portion has a so-called cage of metal or plastics material or another suitable material which is surrounded by a rubber layer which also forms the mentioned connection portion. The mentioned metal cage is used for the stability of the fluid chamber walls formed by the resilient material of the connection portion, prevents folding-over thereof under the action of fluid pressure and thereby enables a reliable sealing of the fluid chambers of the damping circuits with respect to each other.

According to another preferred embodiment, individual elements of the cage partially form reinforcements for the first and second fluid chambers, which affords the previously mentioned advantages with respect to stability.

According to yet another preferred embodiment, the cage is constructed integrally or in one piece, which simplifies the production process and consequently reduces the production costs. However, the cage may also be constructed in a divided manner, as described, for example, in DE 10 2012 213 440.

In the course of a preferred configuration of the rubber bearing according to the invention, the following operating method accordingly results. In the case of fluid chambers of the second damping circuit which are connected in technical fluid terms ("soft" switching state), in the first damping circuit, in the event of radial movement of the bearing, fluid is pressed via the corresponding flow connection (operating channel) from the fluid chambers at one side of the bearing into the fluid chambers at the other side of the bearing, which brings about a damping action. In the second damping circuit, fluid is also pressed at the same time via the free flow connection from one side (switching chamber) into the corresponding switching chamber at the opposite side. The fluid volume in the second damping circuit (occasionally also referred to as a "switching packet") preferably moves only at higher frequencies into resonance as the "operating packet" (fluid volume in the first damping circuit). A partition wall between the first damping circuit and the second damping circuit thereby remains "soft". The corresponding "rubber packet" of the partition wall thus has occurrences of resilience and is involved in the overall system which is capable of oscillation.

In the "hard" switching state, that is to say, when the switching chambers are separated in the second damping circuit, the fluid in the second damping circuit is blocked. The rubber packet mentioned, as a result of the counter-pressure of the fluid in the blocked switching chambers, has no or hardly any occurrences of resilience and consequently no involvement in the system which is capable of oscillation.

As set out in the introduction, during operation of the rubber bearing, that is to say, when it moves—in particular in the "soft" state—as a result of friction effects during the fluid movement within the flow connection (channel), a type of "fluid blockage" occurs in the fluid chambers, particularly at the other side of the resonance frequency. This increases the pressure in the fluid chambers, whereupon the flexible chamber walls yield to this pressure. The measurement of this yielding action determines together with the channel dimensions and the surface of a "deflection spring" which is produced in this manner the position of the resonance frequency and the maximum loss angle.

In this instance—with a corresponding configuration—the closed state of the switching chambers, that is to say, of the fluid chambers of the second damping circuit via the associated fluid pressure, can influence or prevent the "normal" movement of the deflection spring, as produced in the "soft" switching state. This corresponds to a reduction of the volume resilience, whereby the surface of the deflection spring also changes. With a corresponding embodiment of the invention, the system is preferably configured in such a manner that the two effects mentioned above, together with the channel (flow connection) which has remained unchanged, bring about a similar dynamic behaviour/substantially unchanged dynamic (damping) behaviour of the rubber bearing.

BRIEF DESCRIPTION OF THE DRAWINGS

Embodiments of the invention are described in greater detail below with reference to the appended drawings, in which.

Figure 1:
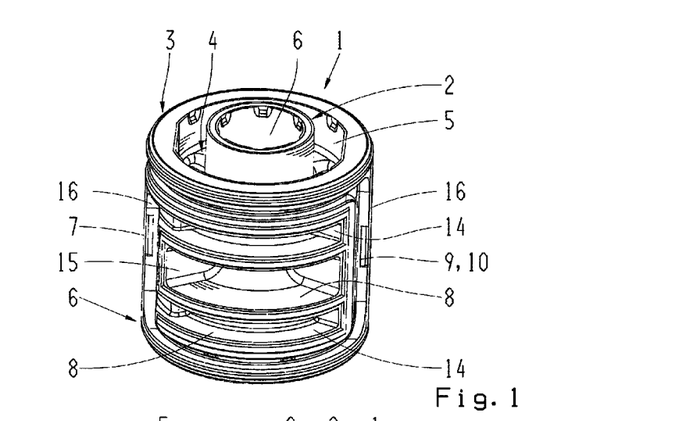
FIG. 1 is an isometric view of a rubber bearing according to an embodiment.

FIG. 1 is an isometric view of a hydraulically damping rubber bearing 1 for a guiding link of a front axle of a motor vehicle according to an embodiment. The rubber bearing 1 comprises a substantially hollow-cylindrical inner portion 2 and an outer portion 3 which is arranged with a specific spacing therefrom, wherein the inner portion 2 and the outer portion 3 are connected by means of a resilient connection portion 4 which is arranged therebetween. The connection portion 4 bridges an intermediate space 5 between the inner portion 2 and the outer portion 3 by means of a number of webs of rubber in order to produce the connection between the inner portion 2 and the outer portion 3. Free regions 6 within the inner portion 2 serve to receive vehicle components which are intended to be connected via the rubber bearing 1, in particular chassis or bodywork components. Furthermore, the rubber bearing 1 may be surrounded by a housing which is not illustrated in this instance. As can be seen, in the outer portion 3 or in the outer surface 7 thereof, a large number of chambers and channels are formed, that is to say, the first and second fluid chambers 14, 15 and associated connection channels (flow connections) which are separated from each other by chamber walls 8 which are flexible—to a greater or lesser extent depending on the wall thickness—and which are described in greater detail in connection with FIG. 2. Components of these chambers and/or channels may also be constructed in a wall of the mentioned housing or connected to each other within a damping circuit. On the outer surface 7, on the webs 9 which form the flexible chamber walls 8, there is provided in each case at the end face a seal 10 for sealing the rubber bearing 1 or the damping circuits against a housing wall which is not illustrated in this instance, in particular in order to separate the individual circuits from each other.

Figure 2:
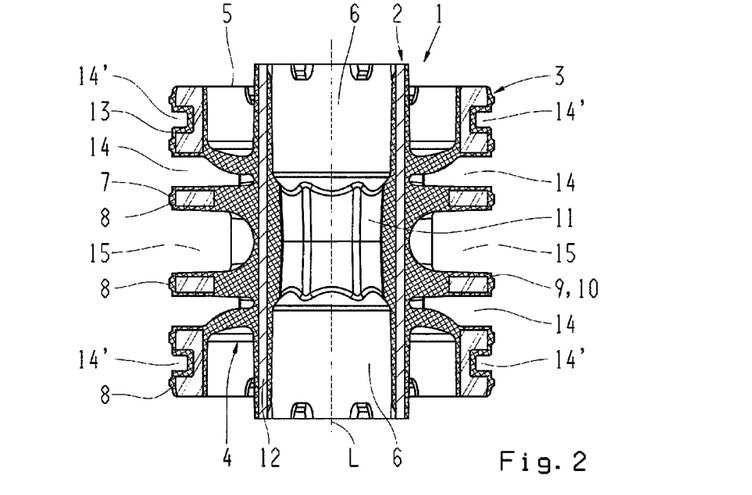
FIG. 2 is a cross-section of the rubber bearing illustrated in FIG. 1.

FIG. 2 is a sectioned view of the rubber bearing 1 illustrated in FIG. 1. As can be seen clearly here, in the substantially hollow-cylindrical inner portion 2 there is provided a portion which has a hexagonal cross-section 11 and which is located substantially in the centre with respect to the longitudinal axis L of the rubber bearing 1. Furthermore, it can be clearly seen in the sectioned view shown here that the inner portion 2 has a hollow-cylindrical core 12 of metal, which is completely surrounded by a rubber layer. The outer portion 3 has, for stabilising the chamber walls 8, an integral, complex structure in the form of a cage 13 of metal, which is also surrounded by a rubber layer. The two rubber layers mentioned merge into each other in the region of the intermediate space 5 and thus form the resilient connection portion 4.

The rubber bearing 1 has a first hydraulic damping circuit with a plurality of first fluid chambers 14 which are located in fluid communication with each other via a first flow connection and which provide a damping action in a predetermined direction, that is to say, in the main damping direction which preferably corresponds to the longitudinal direction of a motor vehicle. The first fluid chambers 14 mentioned are connected to each other in fluid terms both with respect to a side of the rubber bearing 1, that is to say, to the right and left of the longitudinal axis L, and with respect to different sides of the rubber bearing 1, as can also be seen in particular in the FIGS. 3A to 3E which are described below. The channels which are designated 14' in FIG. 2 in the axially end regions of the rubber bearing 1 are also part of the fluid connection mentioned. The fluid connection between the first fluid chambers 14 and the channels 14' mentioned may also be produced at least partially via the housing of the rubber bearing 1 (not shown).

Furthermore, the rubber bearing 1 has a second hydraulic damping circuit which is separate from the first hydraulic damping circuit and which provides a damping action in the same direction as the first hydraulic damping circuit. The second hydraulic damping circuit is constructed to be switchable by means of a valve which is not illustrated in this instance in the flow connection between two second fluid chambers 15 (switching chambers). This valve may be provided in the wall of the housing mentioned. When the second hydraulic damping circuit is switched to "rigid", that is to say, a state in which the valve blocks the flow connection between the fluid chambers 15 and separates it in technical fluid terms, the damping action of the first hydraulic damping circuit nonetheless remains uninfluenced to the greatest possible extent. In order to achieve the required decoupling of the damping actions of the first and second hydraulic damping circuit, the dimensions and the geometry of the first and second fluid chambers 14, 15 which are adjacent in the longitudinal direction L of the rubber bearing 1 are adapted accordingly, inter alia by the second fluid chambers 15 being provided with a specific, approximately U-shaped cross-section (see FIG. 2) and relatively thick chamber walls, to which reference has already been made. The first fluid chambers 14 may in contrast, as illustrated in this instance, be provided with a rather V-shaped profile.

In this context, extensive tests by the Applicant have shown that the geometry of the first and second fluid chambers 14, 15 shown in particular in FIG. 2 brings about or supports the desired independence of the two hydraulic damping circuits. It has already been indicated above that the first fluid chambers 14 which are arranged at the outer side in the longitudinal direction L in the cross-section according to FIG. 2 have a modified U-shaped or substantially V-shaped configuration. This is in particular a result of the fact that the outer rubber wall of the first fluid chambers 14 when viewed in the longitudinal direction is constructed in a convex manner with respect to the actual fluid chamber whilst the opposing rubber wall of the first fluid chambers 14 is instead constructed in a concave manner. In the region of the second fluid chambers 15, the corresponding walls are in contrast constructed in a concave manner at both sides. Furthermore, the rubber boundary walls in the region of the second fluid chambers 15 are constructed with relatively thick walls, and consequently constructed in a rather rigid manner, so that when the rubber bearing is switched to be rigid in the region of the second damping circuit (comprising the second fluid chambers 15) only a relatively small influence of the first damping circuit (comprising fluid chambers 14) is brought about. In addition, an increased rigidity of the partition walls between the second and first damping circuit can be compensated for at least partially by means of an increased resilience of the convex, outer boundary walls of the first fluid chambers 14.

The first hydraulic damping circuit has a different damping frequency from the second hydraulic damping circuit. For example, the first hydraulic damping circuit with the first fluid chambers 14 and the relatively long and thin channel 14' for flow connection of the first fluid chambers 14 may cover a frequency range of from 16 to 17 Hz, whereas the second hydraulic damping circuit with the rather wider fluid chambers 15 and a relatively short and wide channel for flow connection of the second fluid chambers 15 covers a frequency range around approximately 110 Hz, wherein the frequency values mentioned are not intended to be understood to be limiting. In this regard, reference may also be made to the illustrations of the outer portion 3 in FIGS. 3A to 3E. In this instance, FIGS. 3A, 3B and 3E in particular show clearly the connection of the first fluid chambers 14 and the associated meandering channels 14' to each other, whereby the relatively long first hydraulic damping circuit which has already been mentioned is produced.

Figure 3A:
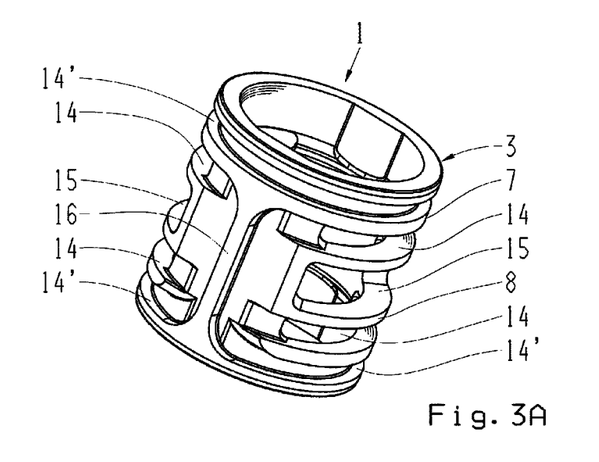
FIGS. 3A-3E are various additional views of an outer portion of a rubber bearing according to an embodiment.
Figure 3B:
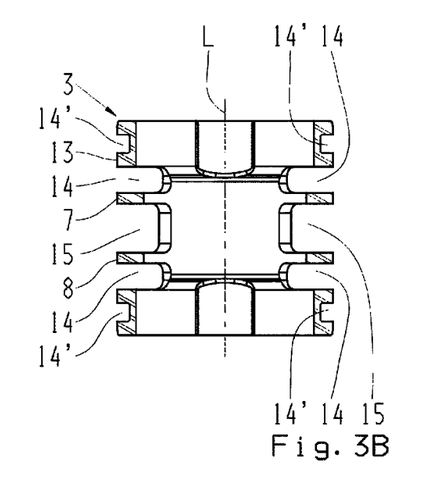
Figure 3C:
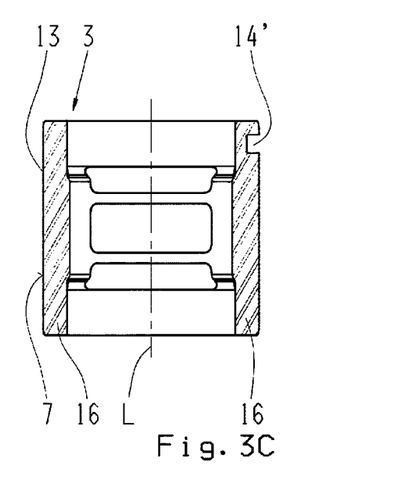
Figure 3D:
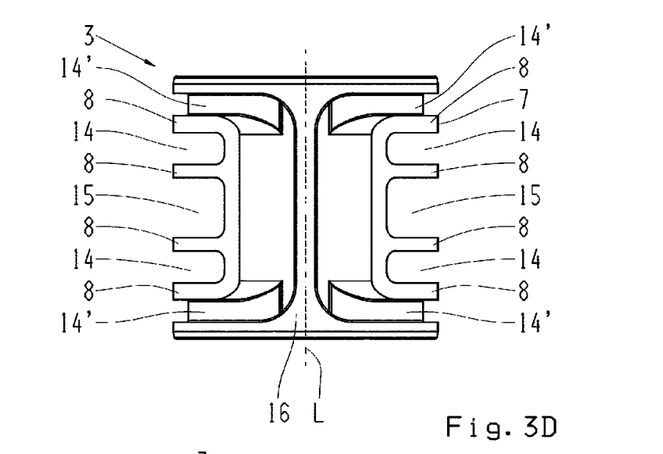
Figure 3E:
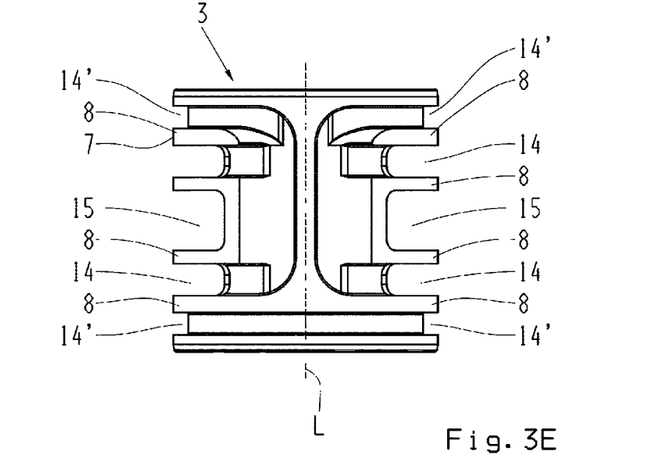

FIGS. 3A to 3E show additional different views of an outer portion 3 of a rubber bearing according to one embodiment. FIG. 3A is an isometric view of the outer portion 3, FIGS. 3B and 3C are each sectioned views of the outer portion rotated through 90° about the axis L, and FIGS. 3D and 3E each show additional side views of the outer portion 3 in different positions with respect to the axis L. As can be seen in FIG. 3C, the outer portion 3 has two longitudinal webs 16 of metal which, for sealing purposes with respect to the housing, are rubber-coated at the outer side. The two longitudinal webs 16 which are arranged offset through 180° divide the outer surface 7 of the outer portion 3 into two halves, which are constructed in a substantially mirror-symmetrical manner. On each of the two halves, there are arranged two outer first fluid chambers 14 in the centre of which an inner second fluid chamber 15 is arranged in each case. There are thus provided on the outer surface 7 of the outer portion 3 a total of two second inner fluid chambers 15 and four first outer fluid chambers 14 which are each connected to each other by means of separate channels, in particular the channels 14'. This can clearly be seen in particular in the illustrations in FIGS. 3A, 3B and 3E. The second fluid chambers 15 are separated from each other in technical fluid terms and from the first fluid chambers 14 by means of the peripheral chamber walls 8, which can, for example, also be clearly seen in FIG. 1. In this instance, the flow connection is carried out completely via the housing (not illustrated) of the rubber bearing. With respect to the first damping circuit, the situation for use is more complex. In this instance, the first fluid chambers 14 are in fluid connection with each other at each side, for example, in accordance with FIG. 3A or FIG. 3E. In accordance, for example, with FIG. 3E, there further exists a fluid connection of these two chambers via the channel 14' illustrated at the top in the drawing with the corresponding fluid chambers at the other side of the arrangement. FIG. 3D shows the technical fluid separation which has already been mentioned of the two halves of the outer portion 3 by means of the continuous longitudinal web 16. In contrast, the other longitudinal web 16 according to FIG. 3E is not completely continuous so that, by means of the channel 14' mentioned, a fluid which is located in the first damping circuit can reach the other side of the arrangement (cf. FIG. 3A and FIG. 3C). According to the illustration in FIG. 3D, at this side only the channels 14' of the first damping circuit are in fluid connection with each other. The first fluid chambers 14 are separated from each other and from the channels 14' mentioned (chamber walls 8). This corresponds to a view of the rear side (not shown) of the illustration in FIG. 3A. According to FIG. 3E, which shows the view of the front side of the illustration in FIG. 3A, the fluid connection which has already been mentioned several times exists between the first fluid chambers 14 and the lower channel 14'. The fluid which is located in the first damping circuit thus reaches via the channel 14' from one side of the arrangement to the other side of the arrangement and is distributed at that location over the first fluid chambers 14 which have already been mentioned several times. In this manner, a relatively long, meandering damping circuit is produced with a relatively high fluid resistance—in contrast to the second damping circuit with relatively large fluid chambers 15 which are connected directly to each other. With corresponding adaptation of the dimensions of the individual fluid chambers and channels to each other, the resonance position and the angle of loss of the rubber bearing can be adapted.

LIST OF REFERENCE NUMERALS

1 Rubber bearing
2 Inner portion
3 Covering face
4 Connection portion
5 Intermediate space
6 Free region
7 Covering face
8 Chamber wall
9 Web
10 Seal
11 Cross-section
12 Core of metal
13 Cage
14 First fluid chamber
14' Channel
15 Second fluid chamber
16 Longitudinal web

The invention claimed is:

1. A hydraulically damping rubber bearing, comprising:
a substantially hollow-cylindrical inner portion;
an outer portion disposed with a predetermined spacing relative to the inner portion;
a resilient connection portion disposed between the inner portion and the outer portion and connecting the outer portion to the inner portion, the resilient connection portion having a first hydraulic damping circuit with at least two first fluid chambers which are in fluid communication with each other via a first flow connection, the first hydraulic damping circuit having a damping action in a predetermined direction; and
a second hydraulic damping circuit providing a damping action in the same predetermined direction as the first hydraulic damping circuit;
wherein the second hydraulic damping circuit has at least two second fluid chambers which are in fluid communication via a second flow connection;
wherein each of the at least two second fluid chambers is defined in an outer face of the rubber bearing between two of the at least two first fluid chambers.

2. A hydraulically damping rubber bearing according to claim 1, wherein the outer portion has an outer surface and the first hydraulic damping circuit is defined radially outward from the outer surface.

3. A hydraulically damping rubber bearing according to claim 2, wherein the second hydraulic damping circuit is defined radially outward from the outer surface.

4. A hydraulically damping rubber bearing according to claim 1, wherein at least one of the first and second hydraulic damping circuits are switchable such that the other of the first and second hydraulic damping circuits remains substantially uninfluenced in terms of its damping action.

5. A hydraulically damping rubber bearing according to claim 4, wherein the second hydraulic damping circuit is switchable.

6. A hydraulically damping rubber bearing according to claim 1, wherein the first hydraulic damping circuit and the second hydraulic damping circuit have different frequency dependencies of the damping action.

7. A hydraulically damping rubber bearing according to claim 1, wherein the second damping circuit has a switchable valve disposed therein, the switchable valve selectively blocking the second flow connection in order to selectively increase overall rigidity of the rubber bearing.

8. A hydraulically damping rubber bearing according to claim 1, wherein the at least two second fluid chambers and the at least two first fluid chambers are each constructed with a U-shaped cross-section.

9. A hydraulically damping rubber bearing according to claim 1, wherein the first damping circuit and the second damping circuit differ in a characteristic selected from the group of differences consisting of different fluid resistances, different lengths, different cross-section values, and different cross-section shapes.

10. A hydraulically damping rubber bearing according to claim 1, wherein the inner portion has a hollow-cylindrical core of metal surrounded by a rubber layer.

11. A hydraulically damping rubber bearing according to claim 1, wherein the outer portion has a cage of metal surrounded by a rubber layer.

12. A hydraulically damping rubber bearing according to claim 1, wherein the inner portion has a hollow-cylindrical core of metal surrounded by a rubber layer; the outer portion has a cage of metal surrounded by a rubber layer; and the rubber layers form the connection portion.

13. A hydraulically damping rubber bearing according to claim 12, wherein individual elements of the cage form metal reinforcements for the fluid chambers.

14. A hydraulically damping rubber bearing according to claim 12, wherein the cage is constructed in one piece.

15. A hydraulically damping rubber bearing, comprising:
a substantially hollow-cylindrical inner portion having a longitudinal axis in an axial direction;
an outer portion disposed with a predetermined spacing relative to the inner portion;
a resilient connection portion disposed between the inner portion and the outer portion and connecting the outer portion to the inner portion, the resilient connection portion having a first hydraulic damping circuit with at least two first fluid chambers which are separated from one another along the longitudinal axis in the axial direction of the inner portion and in fluid communication with each other via a first flow connection, the first hydraulic damping circuit having a damping action in a predetermined direction; and a second hydraulic damping circuit providing a damping action in the same predetermined direction as the first hydraulic damping circuit.

16. A hydraulically damping rubber bearing according to claim 1, wherein the first hydraulic damping circuit has the damping action in a radial direction, and the second hydraulic damping circuit provides the damping action in the same radial direction as the first hydraulic damping circuit.

17. A hydraulically damping rubber bearing according to claim 16, wherein each of the at least two second fluid chambers is defined in the outer face of the rubber bearing axially between two of the at least two first fluid chambers on each axial end of the bearing.

18. A hydraulically damping rubber bearing according to claim 17, wherein the first hydraulic damping circuit comprises four first fluid chambers.

19. A hydraulically damping rubber bearing according to claim 16, wherein each of the at least two second fluid chambers is defined in the outer face of the rubber bearing aligned axially with and between the two of the at least two first fluid chambers.

\* \* \* \* \*